March 26, 1963 E. R. WAGNER 3,083,153
TITANIUM PRODUCING APPARATUS
Filed July 29, 1955 2 Sheets-Sheet 1

INVENTOR.
EDGAR R. WAGNER
BY
ATTORNEY.

March 26, 1963  E. R. WAGNER  3,083,153
TITANIUM PRODUCING APPARATUS
Filed July 29, 1955  2 Sheets-Sheet 2

INVENTOR.
EDGAR R. WAGNER.
BY
ATTORNEY.

United States Patent Office 3,083,153
Patented Mar. 26, 1963

3,083,153
TITANIUM PRODUCING APPARATUS
Edgar R. Wagner, New York, N.Y., assignor to Continental Titanium Corporation, a corporation of New York
Filed July 29, 1955, Ser. No. 525,157
10 Claims. (Cl. 204—246)

This invention relates to improvements in methods of producing titanium in a continuous process by electrolysis, and in the provision of refractory materials which have high melting points, high boiling points, and a higher free energy of formation than that of titanium or of zirconium, said materials being adapted to be used in apparatus for melting titanium or zirconium without contamination.

Another object of the invention is to provision of a refractory formed of an admixture of calcium oxide and calcium fluoride in proportions to render it capable of being in contact with such reactive materials such as titanium and zirconium, while the latter are in a molten state, without contamination.

A further object of the invention is the provision of a refractory formed in part of calcium oxide and in part of calcium fluoride to be used in contact with titanium, zirconium and other chemically reactive metals having extremely high melting points, either as a refractory or as a liner for other refractories which, in the absence of such a liner, would be contaminated by the molten metal.

Yet another object of the invention is the provision of a continuous process of producing titanium by electrolysis, an anode constituting the means to deliver the raw materials ($TiO_2$ plus carbon, plus other ingredients as may be lost by evaporation or consumed in the process) into a cell, so that the finely divided titanium metal formed near a cathode in said cell may agglomerate, and means for subjecting said divided metal to the influence of high frequency electrical impulses to melt the metallic particles and thereby effect the agglomeration. The cathode forms a piston in the bottom and cooled portion of the cell, and the agglomerated titanium moves with the cathode and forms a part of the piston, and as the process continues, the formation of the metallic titanium is continuous, and results in the formation of an ingot of titanium metal.

Other objects and advantages of the invention will be apparent to those skilled in the art, upon a study of this specification and the accompanying drawings.

Referring to the drawings which are given by way of example to illustrate the invention:

Figure 1:
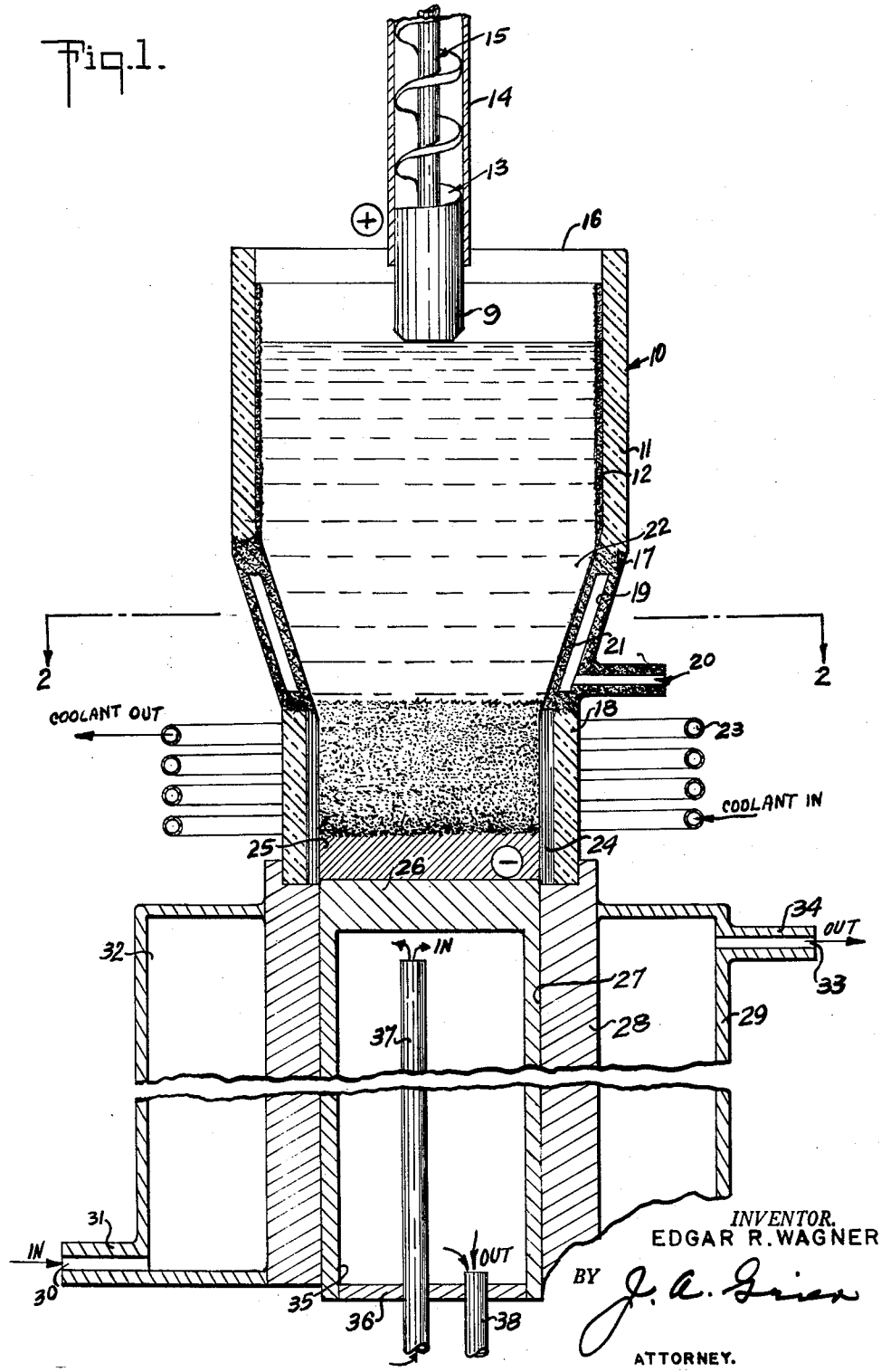
FIGURE 1 is a cross-sectional elevation of my improved apparatus, which I term a cell.
Figure 2:
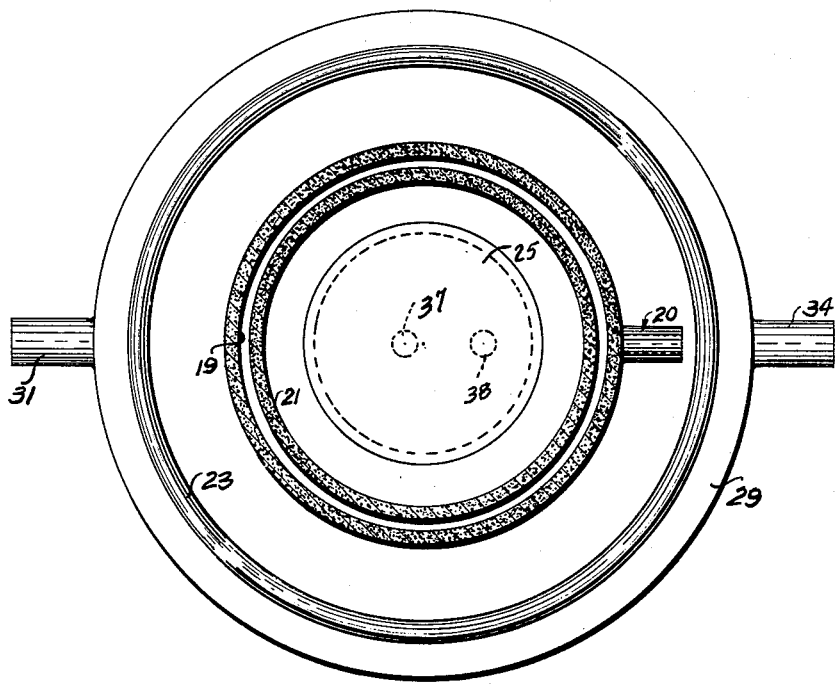
FIGURE 2 is a cross-sectional view taken along the line 2—2 of FIGURE 1, and showing details of the construction of the lower parts of the cell.

The cell, generally designated by the numeral 10, has a portion 11 in the form of an annular wall. This wall may be formed of any suitable material such as graphite, Alundum, Carborundum, zirconium oxide or the like, and in order to protect it, a lining 12 is applied on the inner surface thereof and it may be either sprayed molybdenum or a layer of solid electrolyte, to prevent the calcium fluoride an oxide of the melt from attacking the refractory forming the wall 11, and thus weakening it and also contaminating the melt.

The layer of solid electrolyte referred to above results from air cooling of the outer layer of the bath and forms the best protection. An anode 13 is comprised of an elongated tubular body 14 which may contain a spiral conveyor 15, and it is suitably supported so that it may extend a little below the upper end surface 16 of the cell 10. Cell wall 11 has an extended portion 17 which is tapered and it joins a straight tubular portion 18 of smaller diameter which will presently be described. The tapered portion 17 is preferably formed of a porous refractory and it has a hollow cavity 19 formed therein and this cavity is generally in the form of an inverted frustrum of a cone and is employed for delivering an inert gas, such, for example, as argon into the interior of the cell chamber, the argon gas being led into cavity 19 via an inlet passage 20. The inner wall 21 of the conical portion at least has a degree of porosity which permits the argon gas to seep through the wall and pass into the melting chamber 22.

Surrounding the smaller tubular portion 18 is a coil 23 of copper or other highly conductive tubing 23 which is connected to a source of high frequency (not shown) but of sufficient frequency and intensity to melt the contents of the chamber 22. A cooling medium may be circulated through the coil 23. The portion of the wall 18 may be formed of any suitable material, for example, zirconium silicate and this may be lined with a liner 24 formed of calcium oxide and calcium fluoride thereby forming a non-contaminating liner which has no effect upon the refined titanium which will come in contact with said liner 24 as the system operates.

The anode 13 forms a positive (+) terminal of the cell, and communicating with the cavity 25 defined by the liner 24, is a piston 26 which forms a working fit within a bore 27 formed in an embracing tubular wall 28. Surrounding the tubular wall 28 is an annular water jacket 29 which has an inlet passage 30 formed in a boss 31 to deliver cooling water or any other fluid cooling medium into a chamber 32 defined between the tubular wall 28 and the outer wall 29. An outlet passage 33 leading from the chamber 32 extends through a boss 34.

The piston has an interior bore 35 and this may be closed with a closure plate 36 which may form a fluid tight fit with the lower end or skirt of the piston. Passing through the plate 36 is a conduit 37 for leading a cooling medium into the chamber 35 within the piston. A second conduit 38 extends through the closure plate 36 and communicates with the interior of the piston near the lower end thereof and is therefore provided to remove the cooling medium delivered into the piston via the passage 37 after it has performed its cooling function.

The anode as shown in the drawing is made of a conductive mixture of carbon or graphite in the proper proportion (one atom of carbon to one molecule of $TiO_2$ or twelve parts by weight of carbon to eighty parts by weight of $TiO_2$). In addition to these proportions there are added other ingredients which replace those that may be lost by evaporation or consumed in the process. These are all in small amounts (about one percent each) of calcium oxide and fluoride and such larger amounts of calcium chloride as may be required to supplement the production of metallic calcium from $CaO+CaF_2$ by electrolysis, and to modify the melting temperature and the electrical resistance of the body of molten electrolyte. This process is based upon the property of metallic calcium of reducing titanium oxide to metallic titanium and itself being oxidized into calcium oxide. During the electrolysis, calcium metal is liberated at the cathode, the cathode being the chamber 25 within the liner 24 and influenced by the high frequency impulses imposed by the high frequency winding 23.

Since the bath temperature must be higher than the melting point of titanium in order to produce an ingot the temperature around the cathode is above 1800° C. Calcium boils at 1360° C. It therefore vaporizes as fast as it forms and bubbles through the melt of calcium oxide and calcium fluoride and titanium oxide. It cannot react with the calcium oxide or the calcium fluoride but it does react with TiO and/or $Ti_2O_3$ and $TiO_2$ to produce titanium metal and to regenerate CaO, which had been decomposed in the electrolysis. (Oxygen is liberated together with chlorine if $CaCl_2$ is used at the anode.)

Since the titanium metal is formed in a finely divided condition, it must agglomerate. This it does near the cathode 25 in which zone it is heated by the high frequency coil 23 surrounding the neck 18 of the cell. The metal is maintained at melting temperature until it settles out and becomes a part of the cathode, which slowly recedes into the piston chamber 27 of the water cooled copper body 28, where it solidifies without adhering to the chamber wall.

The process is started by means of a mass of metallic titanium in solid, powdered, or granular form filling the neck 25 of the cell embraced by the coil 23. Above this within the cell, is the electrolyte CaO, $CaF_2$ and TiO ($Ti_2O_3$, $TiO_2$). High frequency energy supplied to the coil 23 melts the metallic titanium in the neck 25, and the heat is, in turn, conducted into the electrolyte and melts the latter.

Since the hottest zone is at the bottom of the melt, due to the high frequency heating, evaporation is minimized because, depending on the bath depth, the temperature gradient between the anode and the cathode can be several hundred degrees centigrade.

The process is continuous due to the fact that the constantly increasing mass of titanium metal displaces the piston downwardly and itself becomes the piston, which is the ingot, and due to said displacement, is constantly removed from the cell.

The anode 13 is constantly replenishing the titanium oxides that are converted to metal. The cell is connected to a suitable source of direct current which maintains the anode 13 positive and the cathode (neck 25) negative.

The anode material 9 is comprised of a pre-mixture of titanium dioxide, carbon and other ingredients referred to hereinabove. These are bonded with a suitable binder, of which asphalt is an example; then the mass is kneaded and is extruded from the tube or die 14 by means of a rotative screw element 15.

Due to the fact that the temperatures in the upper part of the cell are well over 1000° C. the materials as extruded from the die 14 bake into a solid rod 9 which is fed into the cell, and the conveyor feed may be adjusted so that extruded materials 9 are fed into the cell at substantially the same rate that the refined metal leaves the cell via the passage 27.

Refractory Materials

In connection with the melting of chemically reactive metals having very high melting points has heretofore presented a serious problem.

It is known that metals such as titanium and zirconium react with all of the commonly used refractory substances that are otherwise suitable for use in high temperature melting, and that such high melting temperatures plus high chemical reactivity constitute one of the major obstacles to economical processing of these metals.

I have found that calcium oxide possesses both the requisite refractivity and resistance to chemical attack, since its melting point is much higher than that of either titanium or zirconium, and its free energy of formation is also much higher, at the required temperatures, than that of titanium monoxide or of zirconium oxide.

However, plain calcium oxide is subject to several objections:

(a) It is very difficult to produce in satisfactory shape and strength because of the very high temperatures necessary to fuse it;

(b) It sublimes freely at temperatures far below its melting point, and in the temperature ranges required to melt titanium and zirconium;

(c) Its well-known tendency to pick up moisture from the air is a lesser disadvantage since it does not occur at operating temperatures, and (d) It does require protected storage when not in use.

I find that the admixture of calcium fluoride acts as a flux for calcium oxide, and makes it practicable to mold and fire. Since calcium fluoride melts at a much lower temperature than does calcium oxide, and its boiling point is well above the melting point of titanium or zirconium, and since further, its free energy of formation is much higher than even that of calcium oxide, I find that it is an ideal fluxing agent, and I add it to the calcium oxide in quite high percentages and still have a solid solution whose melting point is sufficiently high to give a practical refractory for melting Ti and Zr without contamination by the latter.

I found that as much as 10–12% of $CaF_2$ can be used with CaO to accomplish my purpose.

To impart greater mechanical strength, this material may be used as a liner for other refractories such as zirconium, stabilized zirconium-oxide, aluminum-oxide, silicon carbide, graphite, etc., with or without an intermediate layer of a composition having a somewhat lower melting point to serve as a binder and to compensate for differences in expansion and contraction of said liner and the supporting material.

While calcium oxide plus calcium fluoride is the cheapest combination, strontium oxide or barium oxide have been used by me with other metals of lesser reactivity. Similarly, strontium, barium and lithium fluorides may be substituted for calcium fluorides, since their melting and boiling points are high enough, and their free energies of formation sufficiently greater than that of either titanium or zirconium oxides.

I would also point out that cryolite, a double fluoride of sodium and aluminum, and a good solvent for aluminum-oxide has been used by me for making refractories of alumina at lower temperatures than are now required.

Although I have herein shown and described by way of example an embodiment of the invention and some modifications, it is obvious that many changes may be made in the arrangements shown and described, and in the proportions of ingredients, described throughout this specification, within the scope of the following claims.

I claim:

1. In apparatus for producing titanium metal from its oxides, a cell having a wall formed of a ceramic, the upper portion of said cell being adapted to contain a molten electrolyte of CaO plus $CaF_2$ plus TiO, a portion near the lower end of said cell to receive divided particles of titanium which settle out from said electrolyte, the upper end of said cell constituting an anode and the lower end a cathode, and a coil surrounding said cell for impressing high frequency impulses upon said cell.

2. In apparatus for producing titanium metal from its oxides, a cell having a wall formed of a ceramic, the upper portion of said cell forming an anode and adapted to contain an electrolyte of calcium oxide, calcium fluoride and oxides of titanium, means to deliver electrolyte materials into the top of said upper portion, a lower portion near the lower end of said cell in communication with said upper portion and adapted to receive divided particles of metallic titanium which settle out from said electrolyte, the upper end of said cell forming an anode and the lower end forming a cathode, and coil surrounding said cell for impressing high frequency impulses upon said cell.

3. In apparatus for producing titanium from its oxides, a cell having a wall formed of a ceramic, the upper portion of said cell being adapted to contain a molten electrolyte of calcium oxide, plus calcium fluoride, plus titanium oxide, a portion of said cell near the lower end thereof in communication with said upper portion and adapted to receive divided particles of metallic titanium which settle out from said electrolyte, the upper end of said cell forming an anode and the lower end forming a cathode, and means of the action independent of said anode and cathode to subject said lower portion of said cell to the influence of high frequency impulses sufficient to cause said particles to agglomerate.

4. In apparatus for producing a metal having an extremely high melting point from its oxides, a cell having a wall formed at least in part of a ceramic, the upper end of said cell being connected to the plus terminal of a source of current, said cell also, having a lower portion connected to the negative terminal of said source of current and communicating with said upper end of the cell, an electrolyte in the upper portion of said cell including oxides of calcium and of the metal to be produced and calcium fluoride, and a winding embracing said lower portion of said cell and connected to a source of high frequency current which acts independently of said first mentioned source for causing particles of said metal which settle out from the electrolyte to melt and agglomerate, and means to remove the latter from the lower end of said cell.

5. In apparatus for producing titanium from its oxides, a cell having a wall formed of a ceramic, the upper portion of said cell being adapted to contain a molten electrolyte of calcium oxide, plus calcium fluoride, plus titanium oxides, a portion of said cell near the lower end thereof in communication with said upper portion and adapted to receive divided particles of metallic titanium which settle out from said electrolyte, the upper end of said cell forming an anode and the lower end forming a cathode, means of the action independent of said anode and cathode to subject said lower portion of said cell to the influence of high frequency impulses sufficient to cause said particles to agglomerate, a fluid cooled metallic cylinder forming an extension of the lower end of said cell, and a piston forming a working fit in said cylinder and having a head in a position to receive the agglomerate, said piston also being fluid cooled.

6. Apparatus according to claim 5 in which the winding embracing the lower portion of said cell is formed of a hollow conductor so that a coolant may be passed therethrough.

7. In apparatus for producing a metal having an extremely high melting point from its oxides, a cell having a wall formed at least in part of a refractory, said cell having a lower portion having a calcium oxide and fluoride lining, a fluid cooled cylinder at the lower end of said cell and having a bore in axial alignment with the lower portion of said cell, a piston reciprocally carried in said cylinder, means to fluid cool said piston, an electrical winding embracing said lower portion of said cell, said winding constituting a conduit adapted to have a coolant passed therethrough to be adapted to be connected to a source of high frequency for melting and agglomerating metallic particles which are settled into the bottom portion of cell during the process, said agglomerated metal being adapted to be deposited on the head of said piston, and means to move said piston downwardly substantially in time with the deposit of the agglomerated metal thereon whereby an ingot of said metal may be formed.

8. In apparatus for producing titanium metal from its oxides, a cell having a wall formed of a ceramic, said wall having a lower portion of one diameter, an upper portion of a larger diameter, and a porous portion between and joining said first mentioned portions having a hollow cavity formed therein, and connections to a source for causing an inert gas to pass into the interior of the cell chamber via said porous wall portion.

9. In apparatus for producing titanium metal from its oxides, a cell having a wall formed of a ceramic, an intermediate portion of which is porous and has a cavity formed therein, an anode at the upper end of said cell being connected to the plus terminal of a source of current and the lower end or cathode of said cell being connected to the negative terminal of said source, an electrolyte in the upper portion of said cell including $CaO$, $CaF_2$ plus titanium oxides, and means to deliver an inert gas under pressure into said cavity thereby introducing a film of gas upon at least the porous portion of said wall, which insures the electrical insulation of the refractory metal protecting the ceramic from the cathode.

10. The invention according to claim 9 in which the upper portion of said wall has a protective coating or lining which is comprised of a refractory metal or a layer of solid electrolyte to prevent the calcium fluoride and oxide of the melt from attacking the refractory forming said wall.

References Cited in the file of this patent

UNITED STATES PATENTS

| | | |
|---|---|---|
| 265,962 | Henderson | Oct. 17, 1882 |
| 279,159 | Henderson | June 12, 1883 |
| 856,475 | Kügelgen et al. | June 11, 1907 |
| 1,564,139 | Saklatwalla | Dec. 1, 1925 |
| 2,398,591 | Mitchell | Apr. 16, 1946 |
| 2,647,826 | Jordan | Aug. 4, 1953 |
| 2,707,169 | Steinberg et al. | Apr. 26, 1955 |
| 2,722,509 | Wainer | Nov. 1, 1955 |

FOREIGN PATENTS

| | | |
|---|---|---|
| 13,759 | Great Britain | June 18, 1904 |
| 635,267 | Great Britain | Apr. 5, 1950 |
| 1,082,068 | France | June 16, 1954 |